3,017,327
AZACOLUTIN EXTRACTION FROM S. CINNAMOMEUS VAR. AZACOLUTA
Renato Craveri, Milan, Italy, and Odette L. Shotwell and Thomas G. Pridham, Peoria, Ill., assignors to the United States of America as represented by the Secretary of Agriculture
Filed Nov. 17, 1959, Ser. No. 853,666
2 Claims. (Cl. 167—65)

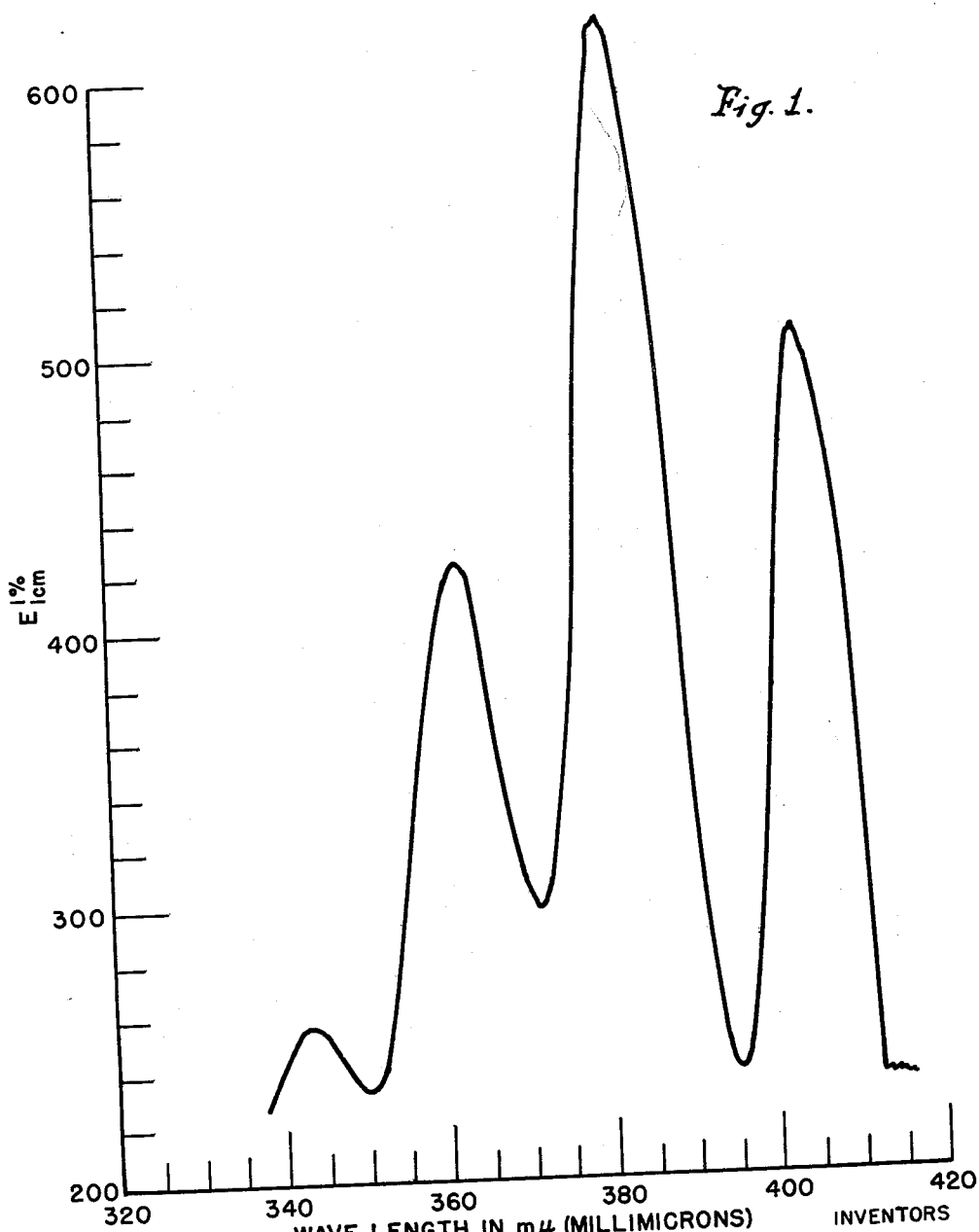

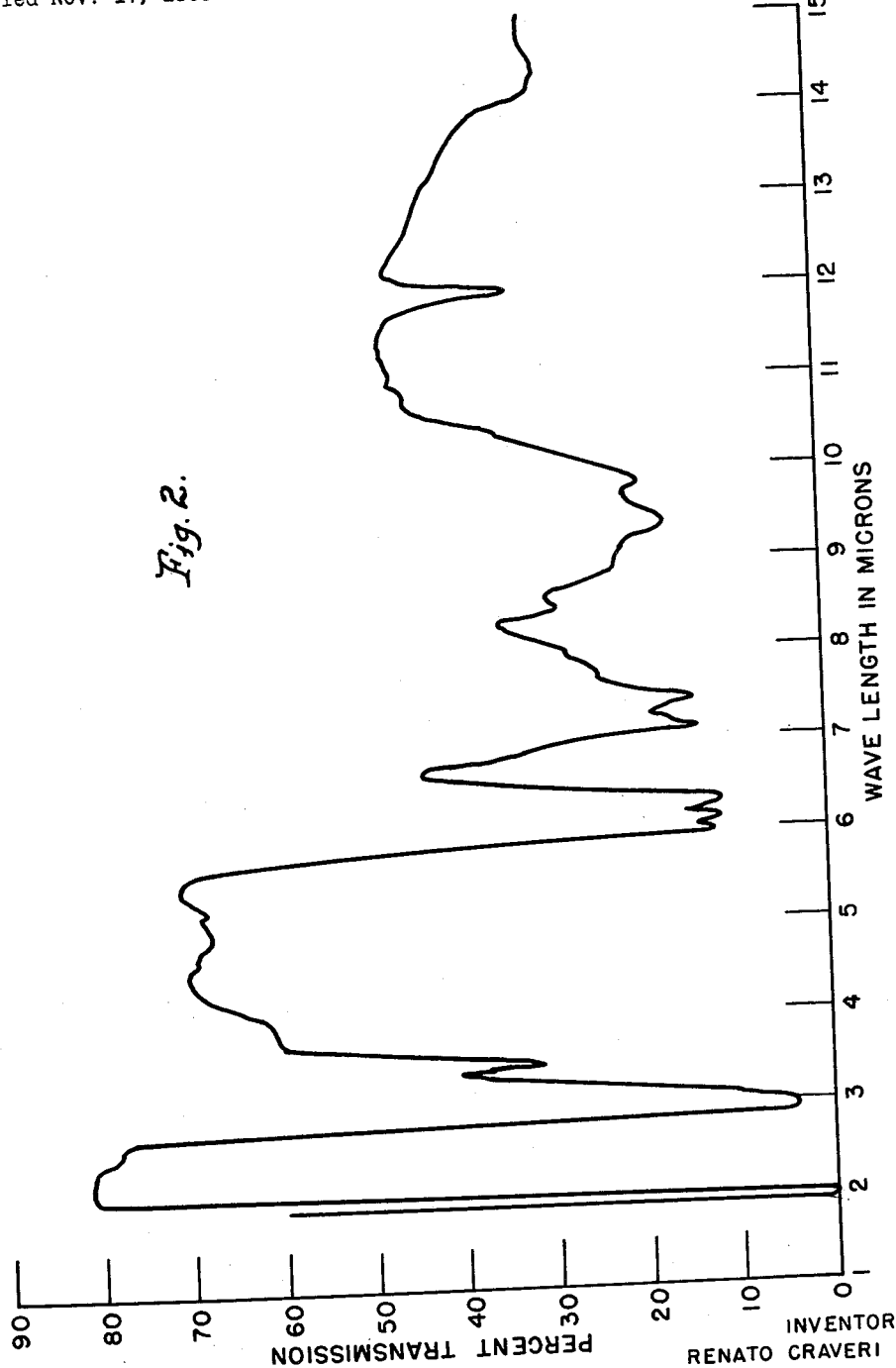

A nonexclusive, irrevocable, royalty-free license in the invention herein described, throughout the world for all purposes of the United States Government, with the power to grant sublicenses for such purposes, is hereby granted to the Government of the United States of America.

This invention pertains to a heretofore uncharacterized antibiotic, having activity against a number of pathogenic yeasts and filamentous fungi in vitro.

This invention further relates to a method of obtaining the said antibiotic in commercially attractive yields.

In U.S. Patent No. 2,865,815 to Lindenfelser et al., a process is disclosed for producing a specific antibiotic mixture by culturing Streptomyces cinnamomeus forma azacoluta (NRRL B–1699). The said patent, which is herewith incorporated by reference, teaches that several distinct antibiotics are present in culture filtrates of the above streptomycete. The said patent teaches the isolation of duramycin from the filtrate by extraction followed by chromatographic purification and also sufficiently characterizes this polypeptide to distinguish it from similar materials. The patent also teaches that at least two other antibiotic materials, named only as "antibiotic A" and "antibiotic C," were shown by chromatographic methods to be present in the crude culture filtrate and in the spray-dried products. Antibiotic A is removed from the culture liquors by activated carbon from which it can be eluted with acidic methanol. Antibiotic C, which shall hereinafter be called azacolutin, is, however, very unstable and is destroyed or irreversibly adsorbed by ion-exchange resins and by activated carbon so that isolation by these means is impracticable.

We have now discovered that the essentially uncharacterized antibiotic, "antibiotic C," that is, azacolutin, in the above Lindenfelser et al. patent can be obtained in large amounts from the mycelium of crude cultures of Streptomyces cinnamomeus forma azacoluta (NRRL B–1699) and that this substance can be isolated in high yields by the commercially practicable processes described below. Still further, we have discovered that azacolutin, which we have also called antibiotic F–17–C is distinctly more effective against yeasts and fungi than is duramycin.

Efforts to determine the chemical structure of azacolutin and to isolate it in crystalline form have not been wholly successful because of its marked instability to light. However, the deep blue color reaction which occurs on treatment with concentrated sulfuric acid is typical of polyenes. Its ultraviolet absorption spectra show it to be a heptaene but also distinguish it from the known antibiotics, candidin, ascosin, trichomycin, and candicidin.

U.V. absorption measurements in ethanol or methanol show peaks at 408 mμ, 383 mμ, and 365 mμ, typical of heptaenes. Its maxima at 390 mμ and 350 mμ in neutral aqueous solution revert at pH 9 to the spectrum exhibited in ethanol. Ascosin, trichomycin, and candicidin in water show only a broad maximum at 320–340 mμ unaffected by pH changes. Candidin in water has a spectrum with an intense maximum at 335 mμ that reverts to alkali to the spectrum given in 95% ethanol. The ultraviolet absorption spectra of azacolutin are given in Table I and FIGURE 1.

TABLE I
Ultraviolet absorption spectra of azacolutin

| Solvent | Peaks (mμ) |
|---|---|
| Ethanol | 408, 383, 365, 347 (weak), shoulder 320. |
| Water, pH 11 | 409, 385, 367, shoulder 320 [1]. |
| Water, pH 9 | 408, 385, 365, 351, shoulder 320 [1]. |
| Water, pH 6.5 | 390, 368 (weak), 350. |
| Water, pH 3 | 390, 347, 374 shoulder. |

[1] Intensities different from ethanol.

Infrared absorption bands for azacolutin were found respectively at 3.0 mμ, 3.5 mμ, 3.9 mμ, 4.6 mμ, 5.2 mμ, 6.1 mμ, 7.2 mμ, 7.7 mμ, 8.5 mμ, 9.4 mμ, 9.9 mμ, 12.0 mμ, and 14.5 mμ. FIGURE 2 is a graph of the infrared spectrum.

Crude azacolutin is readily soluble in aqueous solutions of acids and bases, indicating amphoteric properties. It is also soluble in pyridine, methanol, and dimethylsulfoxide, and is slightly soluble in absolute ethanol and acetone. The solubilities in the last two solvents are increased by the addition of water. Azacolutin is insoluble in diethyl ether, petroleum ether, benzene, chloroform, ethyl acetate, and water.

Paper chromatograms of azacolutin were compared with those of authentic samples of most of the reported heptaene antibiotics, as shown in Table II with solvent system V, below. The chromatograms were run by descending technique on Whatman No. 1 paper strips in five solvent systems, namely: I (upperphase of pyridine; ethyl acetate, water; 2.5:6:7); II (butanol; pyridine; water; 6:4:3); III (upperphase of 1-butanol; glacial acetic acid; water; 20:1:25); IV (upperphase of mixture of amyl alcohols; methanol; water; 1:1:1.5, Rf value 0.75); V (methanol; water; ammonium hydroxide, 20:4:1).

TABLE II
Paper chromatography of heptaene antibiotics
solvent system: $CH_3OH:H_2O:NH_4OH$ (20:4:1)

| Antibiotic, 1 mg./ml., 75% EtOH | Rf values | | | | |
|---|---|---|---|---|---|
| | 0.4 | 0.5 | 0.6 | 0.7 | 0.8 |
| Amphotericin B | | 0.56 | | | |
| Ascosin | 0.46 | | 0.65 | | |
| Candicidin | | | 0.65 | | |
| Candidin | 0.45 | | | | |
| Candidin | | | | 0.64 | 0.80 |
| Candimycin | | | | 0.63 | |
| Trichomycin | | | | 0.72 | |
| Azacolutin | 0.46 | | | 0.71 | 0.81 |
| Antibiotic PA–150 | | | 0.63 | | |
| Antibiotic 1968 | | | | 0.71 | 0.80 |
| Antibiotic 757 | | | | | |

The underlined Rf values are those of the principal component as measured by the size and sharpness of inhibition zone.

The results shown in Table II suggests that there may be active factors common to several of the heptaene antibiotics and that the differences in properties may perhaps arise from quantitative differences in the composition of the "complexes" as well as from qualitative differences. In any event, the combination of factors present in azacolutin was not found in the known heptaenes.

As shown in Table III, azacolutin is active in vitro against a wide spectrum of yeasts and filamentous fungi including phytopathogenic forms. It was not found to be active against bacteria or streptomycetes. It was tested by the agar-streak dilution method using a commercial medium which was dissolved in one liter of tap water to provide a solution containing peptone, 5 g.; malt extract, 3 gm.; yeast extract, 3 gm.; glucose, 5 gm.; beef extract, 5 gm.; NaCl, 2 gm.; corn steep liquor (50% solids), 10 ml.; and agar, 20 gm., the pH being adjusted to 7.0 with NaOH before sterilization. Concentrations of the antibiotic ranged from 0.01 to 200 µg./ml. Inocula of the test organisms were prepared by suspending the growths from slant cultures (2 days old for bacteria and yeasts; 10 days old for fungi and streptomycetes) in 0.85 percent saline solution. Incubation times varied according to the requirements of the different organisms. Azacolutin has not been tested in animals or human beings, and no therapeutic activity or effectiveness therein is represented or implied. The marked in vitro activity of azacolutin might make it a useful agent against such fungal plant diseases as corn smut, Dutch elm disease, sorghum smut, and common root rot of cereal grains.

TABLE III

*Antifungal spectrum of azacolutin*

| Microorganism [1] | NRRL No. | Minimum inhibitory concentration, (µg./ml.) | Incubation period (hours) |
| --- | --- | --- | --- |
| Yeast Forms: | | | |
| *Candida albicans* (Robin) Berkh. | Y-477 | 0.075 | 48 |
| *Saccharomyces pastorianus* Hansen | Y-139 | 0.025 | 48 |
| *Cryptococcus neoformans* (Sanf.) Vuill. | Y-1420 | 0.05 | 48 |
| Phytopathogenic Filamentous Forms: | | | |
| *Alternaria porri* (Ell.) Neerg. f. sp. *solani* (E. et M. pro sp.) Neergaard | 2325 | 1 | 72 |
| *Cephalosporium sp.* Corda | 1866 | 10 | 48 |
| *Cladosporium herbarum* (Pers.) Lk. | 2175 | 0.5 | 96 |
| *Colletotrichum lindemuthianum* (Sacc. et Magn.) Bri. et Cav. | A-5899 | 0.25 | 96 |
| *Diplodia zeae* (Schw.) Lev. | 2282 | 0.5 | 72 |
| *Fusarium bulbigenum* Cke et Mass. var. *lycopersici* (Brushi) Wr. | | | |
| *Glomerella cingulata* (Stonem.) Sp et V. Schr. | 1985 | 25 | 48 |
| *Helminthosporium victoriae* Meehan et Murphy | A-5357 | 5 | 48 |
| *Ceratocystis ulmi* (Buis.) C. Moreau | A-5356 | 0.05 | 48 |
| *Phoma destructiva* Plowr. | 2356 | 0.05 | 48 |
| *Rhizoctonia solani* Kühn | A-5346 | 1 | 72 |
| *Sclerotinia sclerotiorum* (Lib.) de Bary | 2355 | 1 | 72 |
| *Verticillium albo-atrum* Reinke et Berth. | A-5229 | 0.5 | 48 |
| *Ustilago zeae* (Beckm.) Ung. | 1204 | 10 | 48 |
| *Sphacelotheca sorghi* (LK) Clinton | 2321 | 0.1 | 48 |
| Non-Phytopathogenic Filamentous Forms: | | 0.05 | 72 |
| *Aspergillus fumigatus* Fres. | A-1217 | 5 | 48 |
| *Mucor ramannianus* Moeller | 1839 | 0.0125 | 48 |
| *Penicillium roqueforti* Thom | 1172 | 0.5 | 48 |
| *Sporotrichum schenckii* Hektoen et Perkins | A-2851 | 2.5 | 48 |
| *Trichophyton mentagrophytes* (Robin) Blanchard | A-2840 | 100 | 48 |

[1] Incubation temperature for all the microorganisms was 28° C.

Although the above mentioned patent to Lindenfelser et al. teaches that azacolutin is present in the filtrate from cultures of *S. cinnamomeus* f. *azacoluta* (NRRL B-1699), it is present only in commercially insignificant proportions as compared with duramycin. We have now discovered that azacolutin, unlike duramycin, is present in high concentration in the mycelium from which it may be readily extracted with 95 percent ethanol substantially free of associated antibiotic materials, thus facilitating the further purification required, namely precipitation from the ethanol by concentration and recrystallization from the upper phase of a butanol:pyridine:water system.

The following embodiments are given to illustrate the production and recovery of azacolutin:

EXAMPLE I

Production was conducted by propagating *S. cinnamomeus* f. *azacoluta*, NRRL B-1699, for 30 hours in a medium prepared by adding 30 g. of commercial glucose to 1 liter of soybean meal infusion (obtained by heating 60 g. of soybean meal in 1 liter of tap water for 30 minutes at 100° C. with stirring, followed by filtration and readjustment of the volume). Fermentation was conducted in Fernbach flasks at 28–30° C. on rotary shakers operating at 200 r.p.m. The inoculum per 500 ml. of substrate consisted of 25 ml. of a 24-hour rotary-shaken culture of the organism in 1 percent yeast extract-1 percent glucose broth (100 ml./300 ml. Erlenmeyer) seeded with a 5 ml. water suspension of growth from a 2 weeks old oatmeal agar slant. The mycelium from 10 liters was collected by centrifugation and extracted twice by shaking for 30 minutes with 600 ml. portions of 95 percent ethanol, protected from light. Agar-streak dilution assays of the methanol extracts (1:20) against *Saccharomyces pastorianus* Hansen, NRRL Y-139, and *Bacillus subtilis*, NRRL B-765, showed that the extracts contained 4000–8000 dilution units/ml. and 50 dilution units/ml. respectively against the said two organisma. With continuous protection from light, the ethanol extract containing the heptaene was concentrated in vacuo under nitrogen to one-sixth its volume. The precipitate which formed was collected by centrifugation and washed twice with 150 ml. portions of distilled water. The washed precipitate was then dissolved in 120 ml. of 1-butanol:pyridine:water (1:1:2) and immediately added with shaking to 450 ml. of 1-butanol:water (7:8). After 10 minutes of shaking, the resulting emulsion was centrifuged. The upper phase was concentrated in vacuo under nitrogen to 0.6 its original volume, thus inducing precipitation of the polyene antibiotic. The precipitate was collected by centrifugation, washed twice with 100 ml. portions of heptane, and dried in a vacuum dessicator. Approximately 500 mg. of azacolutin was obtained as a yellow amorphous powder. It was inhibitory to *S. pastorianus* at a concentration of 0.025–0.05 µg./ml.

EXAMPLE II

In pilot plant fermentors, aeration rate and agitation were found to be critical for azacolutin production. For these studies, *S. cinnamomeus* f. *azacoluta* NRRL B-1699 was propagated for 30 hours at 28° C. in 20-liter stainless steel vat fermentors in a medium similar to that in the Fernbachs except on a larger scale (10 liters); soybean meal had to be extracted 1 hour at 121°. The aeration rate was 0.25 v./v./min., and the agitation was by a paddle type stirrer operating at 180 r.p.m. (no baffles). Two ml. of heptadecanol was added to each fermentor to control foaming. The inoculum was the same as in Example 1 except that it was grown in Fernbachs (500 ml./flask) for 36 hours.

Yields of 4000–10,000 dilution units/ml. against *S. pastorianus* were obtained. The effects of agitation, aeration, and the absence of baffles on yields are given in the following table.

| Experiment | Yield (dilution units) | | Aeration, v./v./min. | Agitation | |
| --- | --- | --- | --- | --- | --- |
| | 28 hrs. | 36 hrs. | | Stirring (r.p.m.) | Baffles |
| 1 | 50–2,000 | 50–2,000 | 0.5 | 180 | With. |
| 2 | 2,000± | 2,000± | 0.25 | 180 | Do. |
| 3 | 2,000± | 4,000–8,000 | 0.5 | 180 | Without. |
| 4 | 4,000–8,000 | 8,000–10,000 | 0.25 | 180 | Do. |
| 5 | 500 | 20–1,000 | 0.125 | 90 | Do. |
| 6 | 500 | 20–1,000 | 0.25 | 90 | Do. |
| 7 | 2,000–4,000 | 2,000–4,000 | 0.125 | 180 | Do. |
| 8 | <2,000 | <2,000 | 0.125 | 135 | Do. |
| 9 | <1,000 | <1,000 | 0.125 | 270 | Do. |

Having thus disclosed our invention, we claim:

1. A method of obtaining high yields of azacolutin substantially free of duramycin comprising the steps of fermenting *Streptomyces cinnamomeus* f. *azacoluta*

(NRRL B-1699) with aeration and stirring of the fermentation broth, removing the broth from the mycelia, extracting the mycelia with ethanol in the absence of light, concentrating the ethanolic extract under nitrogen to precipitate crude azacolutin, washing the crude precipitate with distilled water, dissolving the washed precipitate in a mixture of 1-butanol, pyridine, and water, centrifuging the solvent mixture to form phases, separating the upper phase containing the azacolutin, concentrating it in vacuo to precipitate the azacolutin therefrom, recovering the precipitate, washing the precipitate in liquid heptane, and drying to obtain the purified azacolutin.

2. The method of claim 1 wherein the aeration comprises introducing one-fourth of the fermentation broth volume of air per minute and wherein the stirring is provided by a baffle-free paddle type stirrer operating at about 180 r.p.m.

References Cited in the file of this patent

UNITED STATES PATENTS 2,865,815    Lindenfelser et al. _____ Dec. 23, 1958

FOREIGN PATENTS 707,332     Great Britain _____ Apr. 14, 1954
1,013,835   Germany _____ Aug. 14, 1954

OTHER REFERENCES

Ball et al.: J. Gen. Microbiology, August 1957, pp. 96–102.

Garrett et al.: J.A.Ph.A., Sci. Ed., July 1954, pp. 385–390.

Umezawa et al.: J. Antibiotics, Ser. A., January 1958, pp. 26–29.

Hosoya et al.: J. Antibiotics, Ser. A., April 1955, pp. 48–50.